US012629763B2

(12) United States Patent
Spaudling

(10) Patent No.: US 12,629,763 B2
(45) Date of Patent: May 19, 2026

(54) IRON HOLDER FORMED BY A CONTINUOUS PIECE OF METAL

(71) Applicant: Apex Brands, Inc., Apex, NC (US)

(72) Inventor: James Spaudling, Lexington, SC (US)

(73) Assignee: Apex Brands, Inc., Apex, NC (US)

( * ) Notice: Subject to any disclaimer, the term of this patent is extended or adjusted under 35 U.S.C. 154(b) by 11 days.

(21) Appl. No.: 18/574,885

(22) PCT Filed: Jul. 21, 2022

(86) PCT No.: PCT/US2022/037847
§ 371 (c)(1),
(2) Date: Dec. 28, 2023

(87) PCT Pub. No.: WO2023/004027
PCT Pub. Date: Jan. 26, 2023

(65) Prior Publication Data
US 2024/0351125 A1 Oct. 24, 2024

Related U.S. Application Data

(60) Provisional application No. 63/224,150, filed on Jul. 21, 2021.

(51) Int. Cl.
B23K 3/02 (2006.01)
(52) U.S. Cl.
CPC .................................... B23K 3/027 (2013.01)
(58) Field of Classification Search
CPC ...................................................... B23K 3/027
See application file for complete search history.

(56) References Cited

U.S. PATENT DOCUMENTS 1,270,304 A * 6/1918 Kuhn et al. ............ B23K 3/027
219/242
1,333,616 A 3/1920 Hall et al.
(Continued)

FOREIGN PATENT DOCUMENTS

GB 1221398 A * 9/1945

OTHER PUBLICATIONS

Steinel heat gun stand, google.com, Jun. 30, 2021, https://www.google.com/search?q=stand+for+heat+gun&safe=active&sca_esv=7363e84110bffb1e&udm=2&sxsrf=AE3TifPQySJdaTv2DAUqbF0SDN4SDRBO6g%3A1757535723026&source=lnt&tbs=cdr%3A1%2Ccd_min%3A%2Ccd_max%3A6%2F30%2F2021&tbm= (Year: 2021).*
(Continued)

*Primary Examiner* — Keith Walker
*Assistant Examiner* — Carlos J Gamino
(74) *Attorney, Agent, or Firm* — Burr & Forman

(57) ABSTRACT

An iron holder includes a stand body, a rest, and a heat shield configured to at least partially surround a soldering iron. The stand body includes a tip support portion, a base portion, an intermediate portion, an accessory holding portion, and a handle support portion. The tip support portion is higher in elevation than the handle support portion, creating a tip-up angle for the soldering iron to rest at. The heat shield is disposed at the tip support portion and comprises one singular piece of metal that is bent into a half-pipe shape and perforated with holes. The handle support portion has a rubberized cover for additional grip and heat insulation. The rest ensures that a tip of the soldering iron does not contact the heat shield. In the tip-up orientation, the soldering iron handle is less likely to increase in temperature from the tip of the soldering iron.

18 Claims, 7 Drawing Sheets

(56)                References Cited

U.S. PATENT DOCUMENTS

| | | | | | |
|---|---|---|---|---|---|
| 2,174,230 | A | * | 9/1939 | Shangle | B23K 3/027 248/176.2 |
| 2,213,439 | A | * | 9/1940 | Young | B23K 3/027 219/242 |
| 2,228,571 | A | * | 1/1941 | Kuhn | B23K 3/027 219/242 |
| 2,326,572 | A | * | 8/1943 | Shangle | B23K 3/027 219/242 |
| 2,355,883 | A | * | 8/1944 | Mathews | B23K 3/027 165/68 |
| 3,294,348 | A | * | 12/1966 | Cerisano | B23K 3/027 248/176.1 |
| 3,327,981 | A | * | 6/1967 | Yates | B23K 3/027 248/176.2 |
| 3,705,680 | A | * | 12/1972 | Siegel | B23K 3/027 219/242 |
| 4,176,778 | A | * | 12/1979 | Fortune | B23K 3/027 248/117.4 |
| 4,333,623 | A | * | 6/1982 | May | F16M 13/00 248/176.2 |
| 4,418,268 | A | | 11/1983 | Munshaw | |
| 4,692,587 | A | * | 9/1987 | Spirk, Jr. | B05C 21/00 222/173 |
| 4,762,979 | A | * | 8/1988 | Geoffroi | B23K 3/027 269/254 R |
| 4,826,049 | A | * | 5/1989 | Speer | B05C 17/00523 200/51.09 |
| D406,513 | S | * | 3/1999 | Knapp | D8/71 |
| 7,137,584 | B2 | * | 11/2006 | Wong | H01R 43/02 242/171 |
| 7,784,750 | B2 | * | 8/2010 | Burk | A45D 20/12 248/176.2 |
| 2008/0067164 | A1 | * | 3/2008 | Kuo | B23K 3/027 219/242 |
| 2010/0108827 | A1 | * | 5/2010 | Teraoka | B23K 3/027 248/117.2 |
| 2017/0165771 | A1 | | 6/2017 | Teraoka et al. | |
| 2024/0351124 | A1 | * | 10/2024 | Batsa | B23K 3/033 |

OTHER PUBLICATIONS

International Search Report and Written Opinion from corresponding International Application No. PCT/US2022/037847 mailed Oct. 26, 2022, all pages cited in its entirety.

* cited by examiner

IRON HOLDER FORMED BY A CONTINUOUS PIECE OF METAL

TECHNICAL FIELD

Example embodiments generally relate to soldering tools and, in particular, relate to such a soldering iron holder having the ability to support a soldering iron.

BACKGROUND

Soldering tools, which are sometimes referred to as soldering irons or soldering guns, are commonly used in electronics manufacturing and repair activities along with other crafts and industries that involve metalwork. Soldering tools are typically used to join metallic items together at a joint by melting a filler metal (i.e., solder) into the joint. The solder has a lower melting point than the items being joined together at the joint, so the soldering tool needs to apply heat sufficient to melt the solder, but not hot enough to melt the items being joined.

Although a number of soldering tool designs have been proposed, a basic soldering tool design includes at least a tip portion that is operably coupled to a heater. The tip portion may, due to operation of the heater, become hot enough to melt the solder that contacts the tip portion. The tip portion may, in some cases, be removable/interchangeable so that a number of different geometries (e.g., sizes and/or shapes) of tips or bits can be substituted for respective different jobs. For example, some tip geometries (or shapes) may include a fine conical tip, a tapered chisel tip, a pyramid tip, a triangular flat face tip, a wide flat face tip, etc., where different sizes may further be available within each respective shape category.

Soldering is often performed at a workstation, and may be performed in some cases using soldering irons that simply plug into the wall outlet nearby and rest in soldering iron holders when not in use. Typically, iron holders are configured to orient the soldering iron in such a way so that the handle is higher up than the tip, so that the operator may more easily grab the handle to use the soldering iron again. However, with the amount of heat soldering irons operate with, the handle of a soldering iron may tend to get hot through natural laws of heat transfer while the soldering iron is resting in a position where the handle is above the tip. It may be undesirable to allow such heat transfer up the front end of the iron handle.

BRIEF SUMMARY OF SOME EXAMPLES

Some example embodiments may enable the provision of an iron holder that holds a soldering iron in a more effective, tip-up, resting position.

In an example embodiment, an iron holder for supporting a soldering iron may be provided. The iron holder may include a stand body having a tip support portion, a base support portion that may be operably coupled to the tip support portion, and a handle support portion that may be operably coupled to the base portion and may support a handle of the soldering iron. The tip support portion and the handle support portion may extend away from the base portion. The tip support portion may extend a greater distance away from the base portion than the handle support portion and may define a tip-up rest position for the soldering iron when the iron is supported in the iron holder.

In another example embodiment, a soldering system may be provided. The soldering system may include a soldering iron and an iron holder for supporting the soldering iron. The iron holder may include a stand body. The stand body may further include a tip support portion, a base support portion that may be operably coupled to the tip support portion, and a handle support portion that may be operably coupled to the base portion and may support a handle of the soldering iron. The tip support portion and the handle support portion may extend away from the base portion. The tip support portion may extend a greater distance away from the base portion than the handle support portion and may define a tip-up rest position for the soldering iron when the iron is supported in the iron holder.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1A:
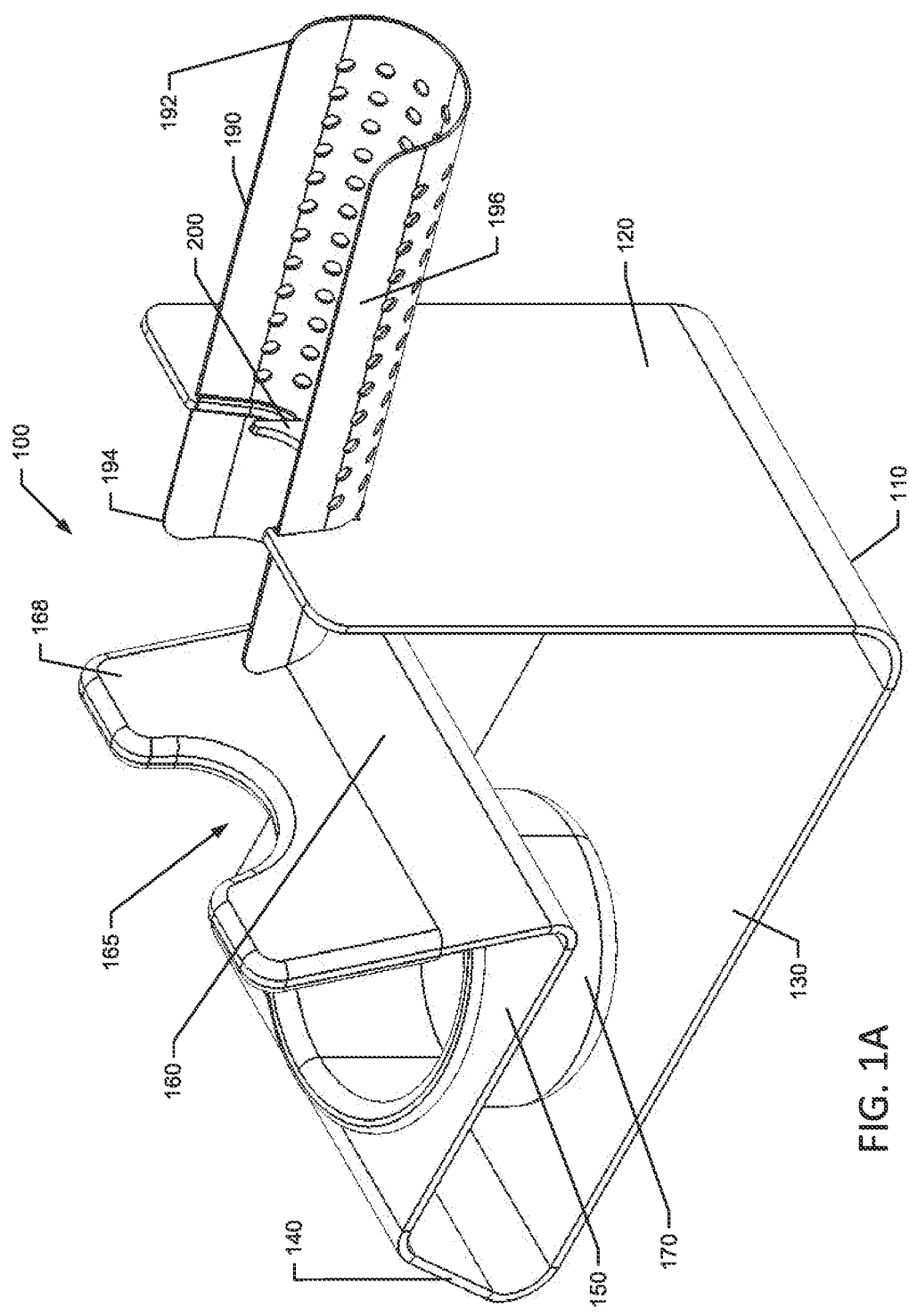
FIG. 1A illustrates a perspective view of an iron holder according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a soldering iron holder that includes features that make it safer to store a soldering iron with a hot tip. In some cases, a heat shield may be employed to assist in this regard. However, other strategies and features are also contemplated as described in greater detail below.

FIG. 1A illustrates a perspective view of an iron holder 100 according to an example embodiment. As shown in FIG. 1A, the iron holder 100 may include a stand body 110. The stand body 110 may further include a tip support portion 120, a base portion 130, an intermediate portion 140, an accessory holding portion 150, and a handle support portion 160. In some embodiments, the stand body 110 may comprise a single sheet of metal that may be bent and cut into shape. In this regard, the stand body 110 may be continuous at the meeting points of the tip support portion 120 with the base portion 130, the base portion 130 with the intermediate portion 140, the intermediate portion 140 with the accessory holding portion 150, and the accessory holding portion 150 with the handle support portion 160.

The tip support portion 120 may be planar and extend away from the base portion 130. In some embodiments, the tip support portion 120 may be orthogonal to the base portion 130. In some embodiments, the tip support portion 120 may be disposed at an angle other than 90 degrees to the base portion 130. In this regard, the base portion 130 may be substantially horizontal and planar. The base portion 130 may be the portion of the stand body 110 that contacts the surface that the iron holder 100 is placed on. However, in some embodiments, rubber, plastic or other material may be attached to the base portion 130 (e.g., at respective corners thereof) to actually contact the surface that the iron holder 100 is placed on. In either case, the base portion 130 generally supports all other portions of the iron holder 100.

The intermediate portion 140 may be planar and extend away from the base portion 130. In some embodiments, the intermediate portion 140 may be orthogonal to the base portion 130. In some embodiments, the intermediate portion 140 may be disposed at an angle other than 90 degrees relative to the base portion 130. The intermediate portion 140 may extend to a distance away from the base portion 130 that is less than one half of that of the tip support portion 120. In some embodiments, the intermediate portion 140 may extend to a distance away from the base portion 130 that is roughly equal to one third of that of the tip support portion 120. The height of the intermediate portion 140 may define an offset distance of the accessory holding portion 150 from the base portion 130. The accessory holding portion 150 may be offset from, yet substantially parallel to, the base portion 130. In some embodiments, the accessory holding portion 150 may have a space cut out of the metal material. This may enable the accessory holding portion 150 to hold an accessory within the cut out space. In some embodiments, the accessory disposed in the accessory holding portion 150 may be a cup 170. In some embodiments, the cup 170 may be removable from the accessory holding portion 150 of the stand body 110. In some embodiments, the cup 170 may be used to hold a cleaning device (not pictured). In some embodiments, the cleaning device may be a brass sponge.

The handle support portion 160 may extend away from the accessory holding portion 150. The handle support portion 160 may, in some cases, be disposed orthogonally to the accessory holding portion 150. In this regard, the handle support portion 160 and the tip support portion 120 may be substantially parallel to each other. In some embodiments, the handle support portion 160 may be disposed at an angle less than 90 degrees relative to the accessory holding portion 150. In this example, the handle support portion 160 and the tip support portion 120 may not be parallel. In some embodiments, the handle support portion 160 may include a semi-circular notch 165 cut into the top (or distal) edge of the handle support portion 160. In some embodiments, the handle support portion 160 may also include a cover 168. The cover 168 may be made of an insulating material (e.g., plastic, rubber, composite materials, etc.).

Figure 1B:
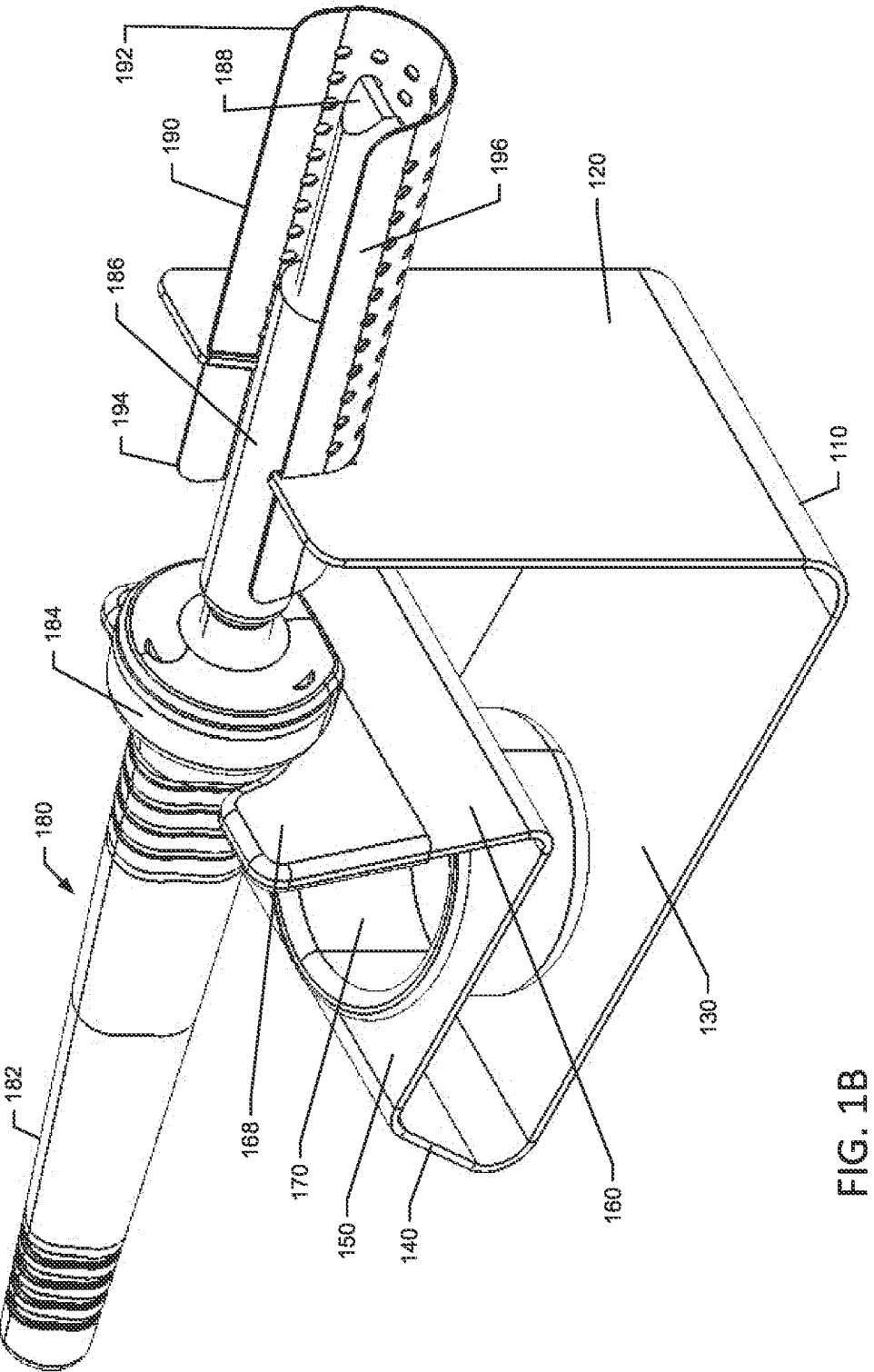
FIG. 1B illustrates a perspective view of the iron holder of FIG. 1A holding a soldering iron according to an example embodiment.

FIG. 1B illustrates a perspective view of the iron holder 100 of FIG. 1A holding a soldering iron 180 in a tip-up resting position according to an example embodiment. As shown in FIG. 1B, the soldering iron 180 may include a handle 182, a transition portion 184, a shaft portion 186, and a tip 188. In some embodiments, the soldering iron 180 may be connected to a power source (e.g. mains power) (not shown) at an end of the handle 182 opposite from the transition portion 184. The transition portion 184 may be where the handle 182 meets the shaft portion 186. The shaft portion 186 may operably couple the tip 188 to the transition portion 184. The tip 188 may be the part of the soldering iron 180 that actually heats up in order to perform a soldering operation. In some embodiments, the tip 188 may be removable from the shaft portion 186. In some embodiments, the soldering iron 180 may comprise a larger diameter at the transition portion 184 than at any of the handle 182, the shaft portion 186 or the tip 188. The diameter of the transition portion 184 may be larger than the diameter of the semi-circular notch 165 cut into the top edge of the handle support portion 160. In this regard, the transition portion 184 may assist in enabling the soldering iron 180 to be secured in the tip-up resting position by interacting with the handle support portion 160 around the perimeter of the notch 165. In some embodiments, the handle support portion 160 of the iron holder 100 may, as noted above, comprise the cover 168. In some embodiments, the cover 168 may be made from a material that may minimize heat conduction and may help grip the handle 182 just behind the transition portion 184, to hold the soldering iron 180 in place. In some embodiments the cover 168 may be made of a silicon-based material.

The iron holder 100 may also include a heat shield 190. The heat shield 190 may prevent the operator or other objects from touching the tip 188 of the soldering iron 180 while the soldering iron 180 is resting in the iron holder 100. In some embodiments, the heat shield 190 may comprise a singular piece of metal that may be bent and cut into shape. In some embodiments, the heat shield 190 may be perforated with holes to allow for better circulation of air to the tip 186, and avoid focusing the heat generated by the tip 186 at a location above the heat shield 190. In some embodiments, the heat shield 190 may be bent into a half-pipe shape to make it easier for an operator to insert and remove the soldering iron 180 into the iron holder 100 in the tip-up orientation shown in FIG. 1B. In some embodiments, the heat shield 190 may also include lateral sides 196 on the ends of the half-pipe shape. The lateral sides 196 may extend a distance above the axis 210 in order to provide better coverage of the shaft portion 186 and the tip 188 of the soldering iron 180. The iron holder 100 may further comprise a rest 200. (The rest 200 may be better depicted in FIGS. 1A and 4A). The rest 200 may be disposed in the heat shield 190 at the intersection of where the heat shield 190 meets the tip support portion 120 of the stand body 110. The rest 200 may assist in holding the shaft portion 186, and thus the tip 188, of the soldering iron 180 up and out of contact with the heat shield 190. In some embodiments, the rest 200 may include a semi-circular notch cut into the top edge of the rest 200. In this regard, the rest 200 may be the only portion of the iron holder 100 that contacts the shaft portion 186 of the soldering iron 180 while the soldering iron 180 is resting in the iron holder 100.

Figure 2:
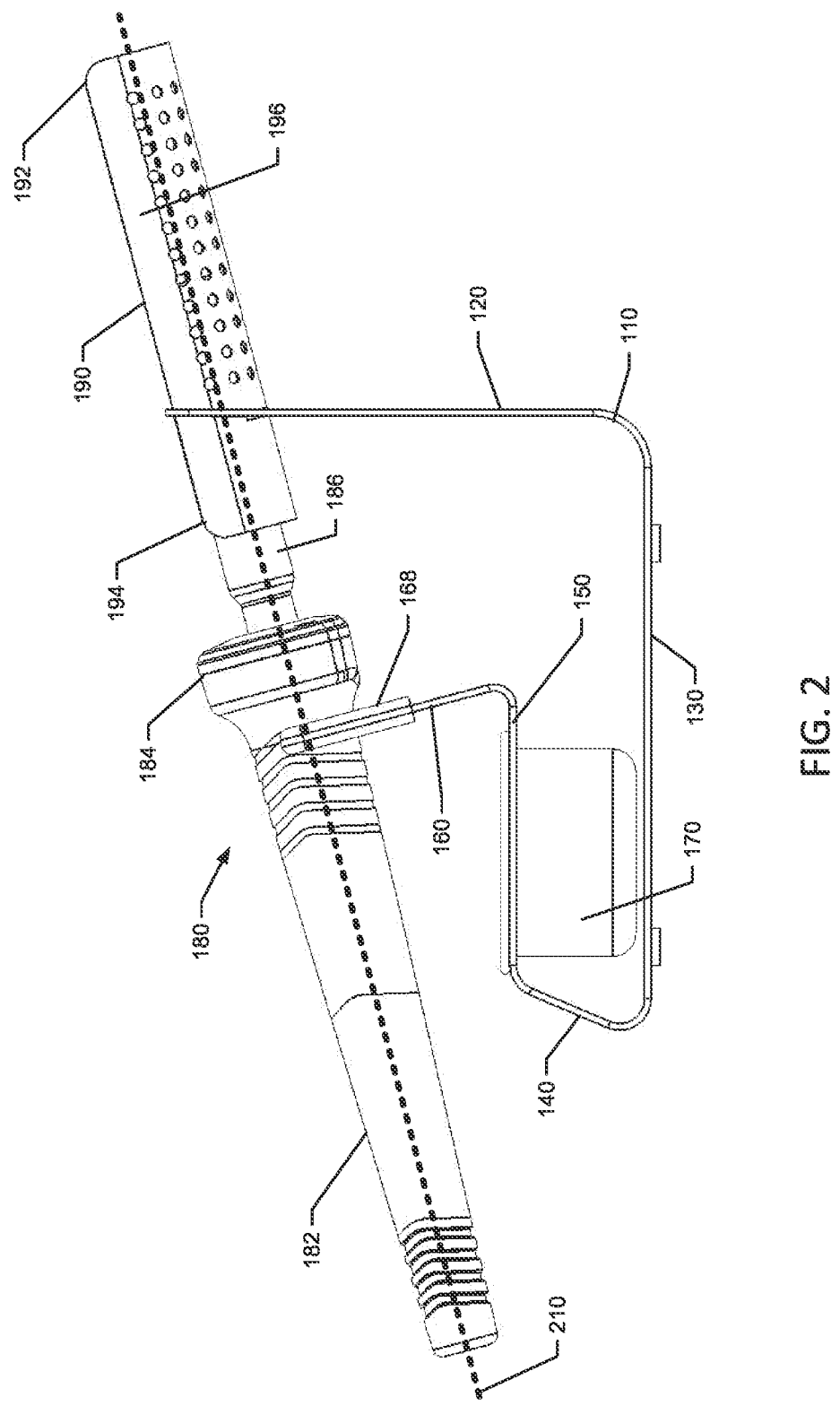
FIG. 2 illustrates a side view of the iron holder of FIG. 1A holding a soldering iron in accordance with an example embodiment.

FIG. 2 illustrates a side view of the iron holder 100 of FIG. 1A holding a soldering iron 180 in accordance with an example embodiment. FIG. 2 better depicts that the tip support portion 120 may extend to a greater distance away from the base portion 130 than the handle support portion 160. The difference in the distance between the top of the tip support portion 120 and the top of the handle support portion 160 may cause the soldering iron 180 to be disposed at an angle of between 10 and 30 degrees relative to the base portion 130 in the tip-up resting position. In this regard, the heat shield 190 may have an elevated end 192 that is disposed at a greater distance away from the base portion 130 than both the handle support portion 160 and a lower end 194 of the heat shield 190. The lower end 194 may be disposed at a lesser distance away from the base portion 130 than the elevated end 192. In some embodiments, the elevated end 192 may be the point of maximum elevation of the entire iron holder 100 when the iron holder is standing upright on the base portion 130. The elevated end 192 of the heat shield 190 may be on an opposite side of the rest 200 from the lower end 194. In this regard, the tip 188 of the soldering iron 180 may be proximate to the elevated end 192 of the heat shield 190 when the soldering iron 180 is resting in the iron holder 100. The elevated end 192 of the heat shield 190 may extend beyond the tip 188 when the soldering iron 180 is in the resting position. In this regard, the heat shield 190, the rest 200, the handle support portion 160, and the soldering iron 180 may all be coaxial about axis 210 when the soldering iron 180 is resting in the iron holder 100 to define a tip-up resting position. In the tip-up resting position, the highest point of elevation on the soldering iron 180 may be the tip 188. In this regard, the elevation of the elevated end 192 may still exceed the elevation of the tip 188. In some embodiments, in the tip-up resting position, the soldering iron 180 may be supported and/or contacted by two points of contact with the iron holder 100 for stability. In some embodiments, the two points of contact may be the handle support portion 160, and the rest 200. However, it may also be possible to remove the rest 200 so that only one point of contact (e.g., the handle support portion 160) with the soldering iron 180 may be defined for the iron holder 100.

As a result of the soldering iron 180 being in the tip-up resting position, the handle 182 is less likely to get hot while the soldering iron 180 is not in use. In an orientation where the tip 188 is the highest point of elevation of the soldering iron 180, heat from the tip 188 is better transferred to the air surrounding the tip 188 as well as the heat shield 190. Thus, in this tip-up orientation, the handle 182 is better insulated due to the natural laws of heat transfer. Additionally, the handle 182 is also insulated in part from the cover 168 on the handle support portion 160. In this regard, when an operator attempts to grab hold of the handle 182 to use the hot soldering iron 180, the handle 182 is less likely to be hot.

Figure 3:
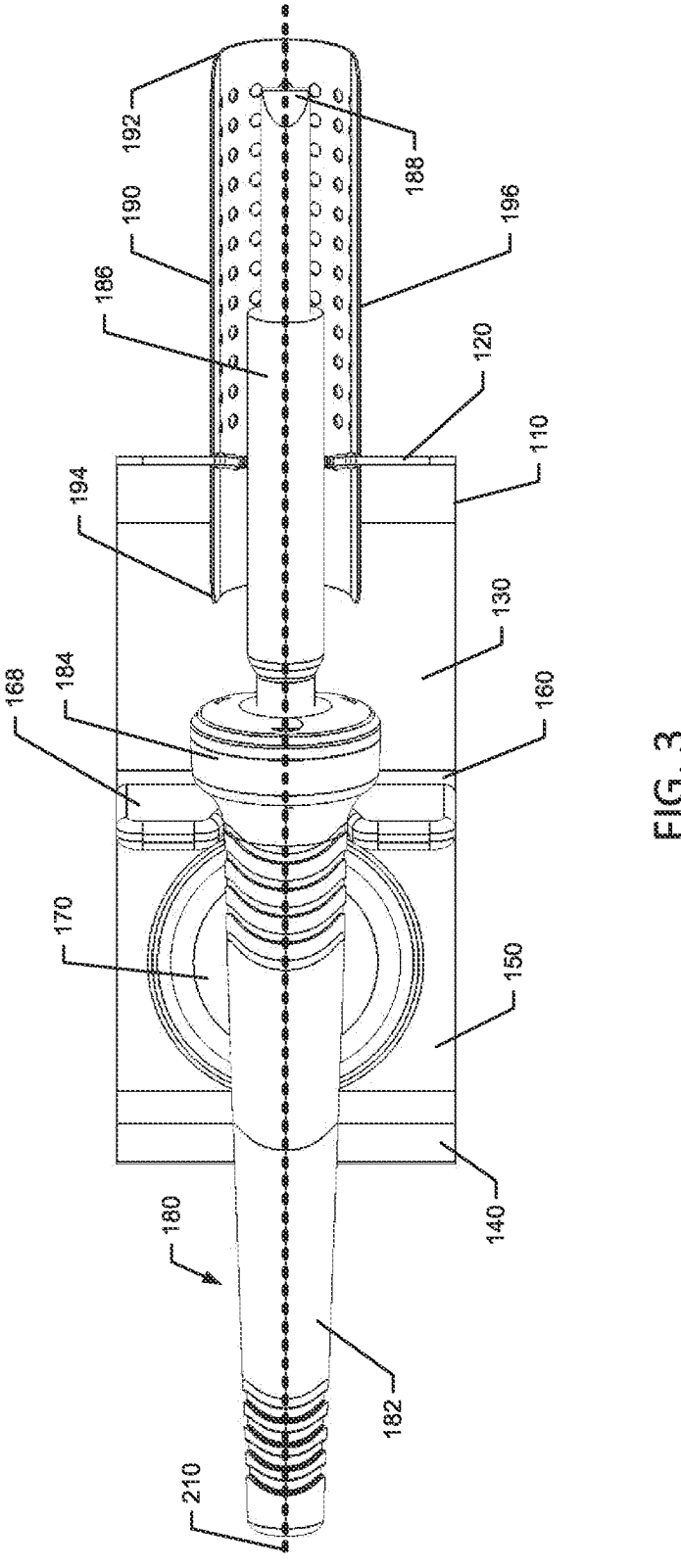
FIG. 3 illustrates a top view of the iron holder of FIG. 1A holding a soldering iron in accordance with an example embodiment.

FIG. 3 illustrates a top view of the iron holder 100 of FIG. 1A holding a soldering iron 180 in accordance with an example embodiment. Additionally, FIG. 3 shows an alternative view to axis 210. In this view, it is apparent how the heat shield 190, the rest 200, the handle support portion 160, and the soldering iron 180 may all be coaxial about axis 210. In some embodiments, the heat shield 190 extends beyond the tip 188 of the soldering iron 180. That said, since the heat shield 190 may be spaced apart from the handle support portion 160, the heat shield 190 need not necessarily be longer than the distance from the transition portion 184 to the distal end of the tip 186. In other words, a length of the heat shield 190 along the axis 210 (e.g., from the elevated end 192 to the lower end 194) need not be greater than a length of the shaft portion 186, plus the tip 188, measured from the transition portion 184 to the distal end of the tip 188. Instead, the lower end 194 of the heat shield 190 may be spaced apart from the handle support portion 160 by an amount sufficient to ensure that the tip 188 cannot extend beyond the elevated end 192 of the heat shield 190. In some embodiments, and as mentioned previously, the transition portion 184 may interact with the handle support portion 160 and hold the soldering iron 180 in the tip-up resting position.

Figure 4A:
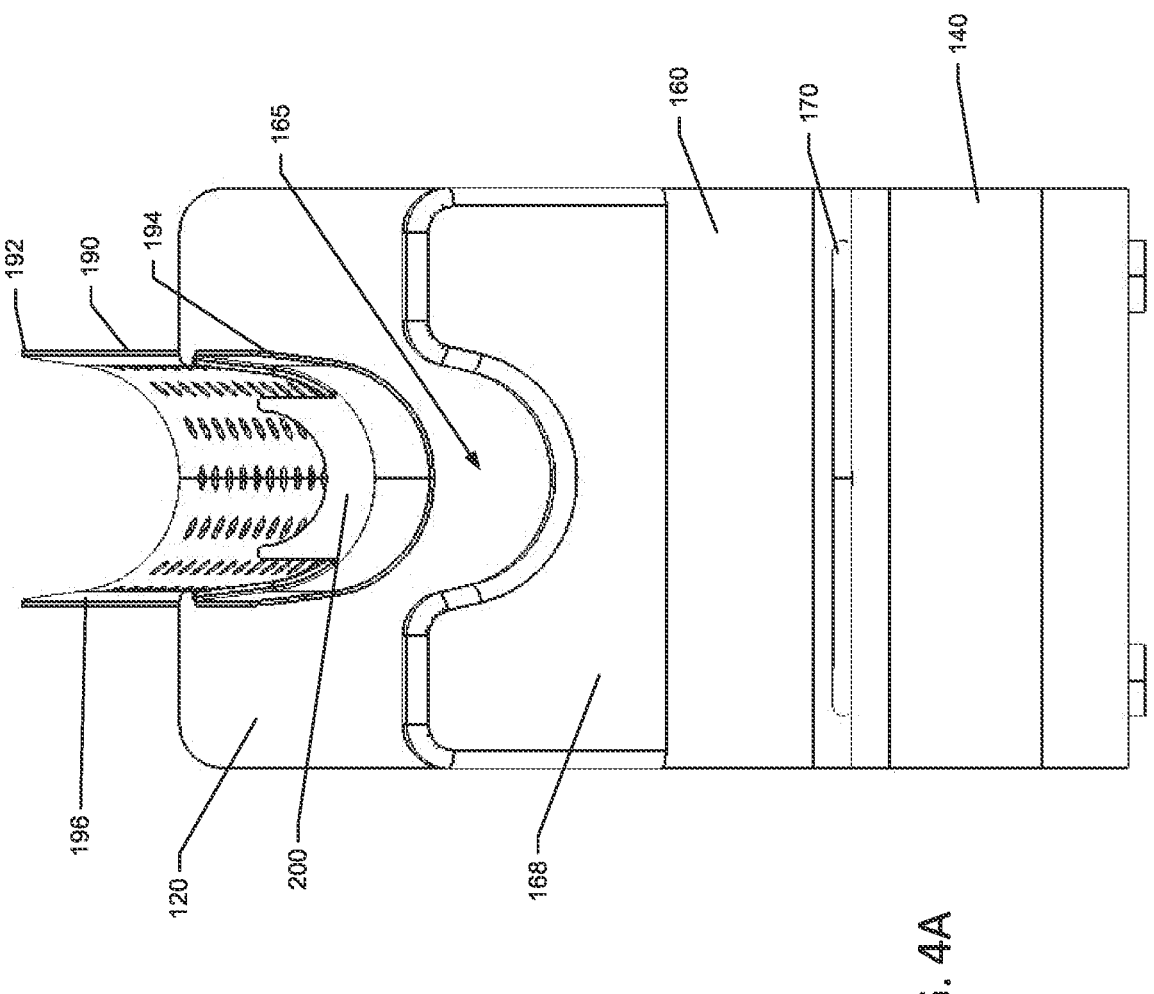
FIG. 4A illustrates a rear view of the iron holder of FIG. 1A according to an example embodiment.

FIG. 4A illustrates a rear view of the iron holder 100 of FIG. 1A according to an example embodiment. In some embodiments, roughly one quarter of the heat shield 190 may be disposed below the rest 200 and/or the tip support portion 120. In some other embodiments, roughly one third of the heat shield 190 may be disposed on the lower side of the rest 200 and/or the tip support portion 120. In some embodiments, both the rest 200 and the notch 165 are substantially semi-circular. In some embodiments, the rest 200 and the notch 165 may contact the soldering iron 180 when the soldering iron 180 is in the tip-up resting position.

Figure 4B:
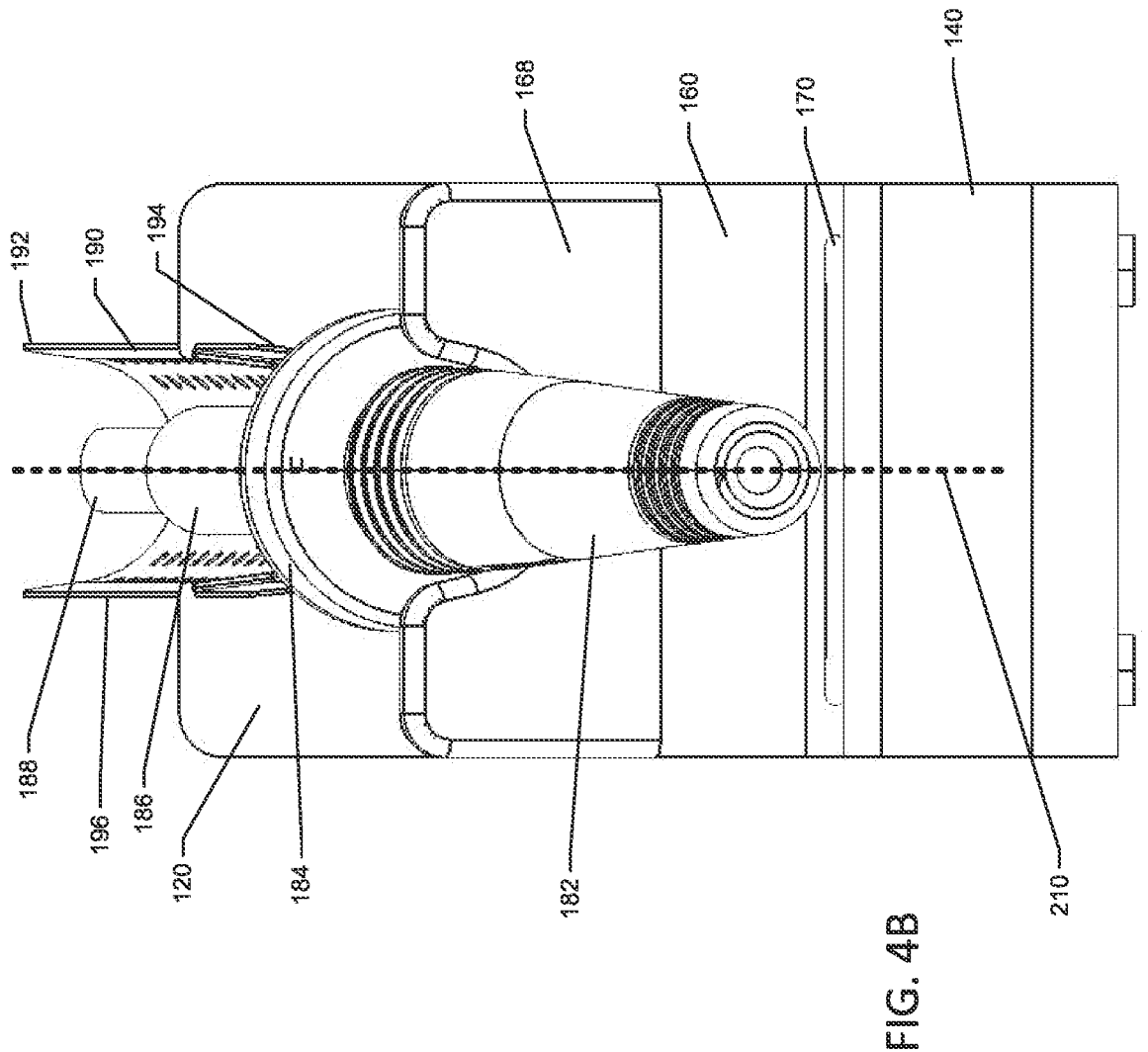
FIG. 4B illustrates a rear view of the iron holder of FIG. 1A holding a soldering iron in accordance with an example embodiment.

FIG. 4B illustrates a rear view of the iron holder 100 of FIG. 1A holding a soldering iron 180 in accordance with an example embodiment. In this regard, the soldering iron 180 is shown in the tip-up resting position from a rear view. The axis 210 is again shown in a different view, this time highlighting the coaxial relationship of the heat shield 190, the rest 200, the handle support portion 160, and the soldering iron 180 from the rear view. In some embodiments, and as mentioned previously, the transition portion 184 may interact with the handle support portion 160 and hold the soldering iron 180 in the tip-up resting position. In this regard, the handle 182 of the soldering iron 180 may not get hot while resting in the iron holder 100 in between uses.

Figure 5:
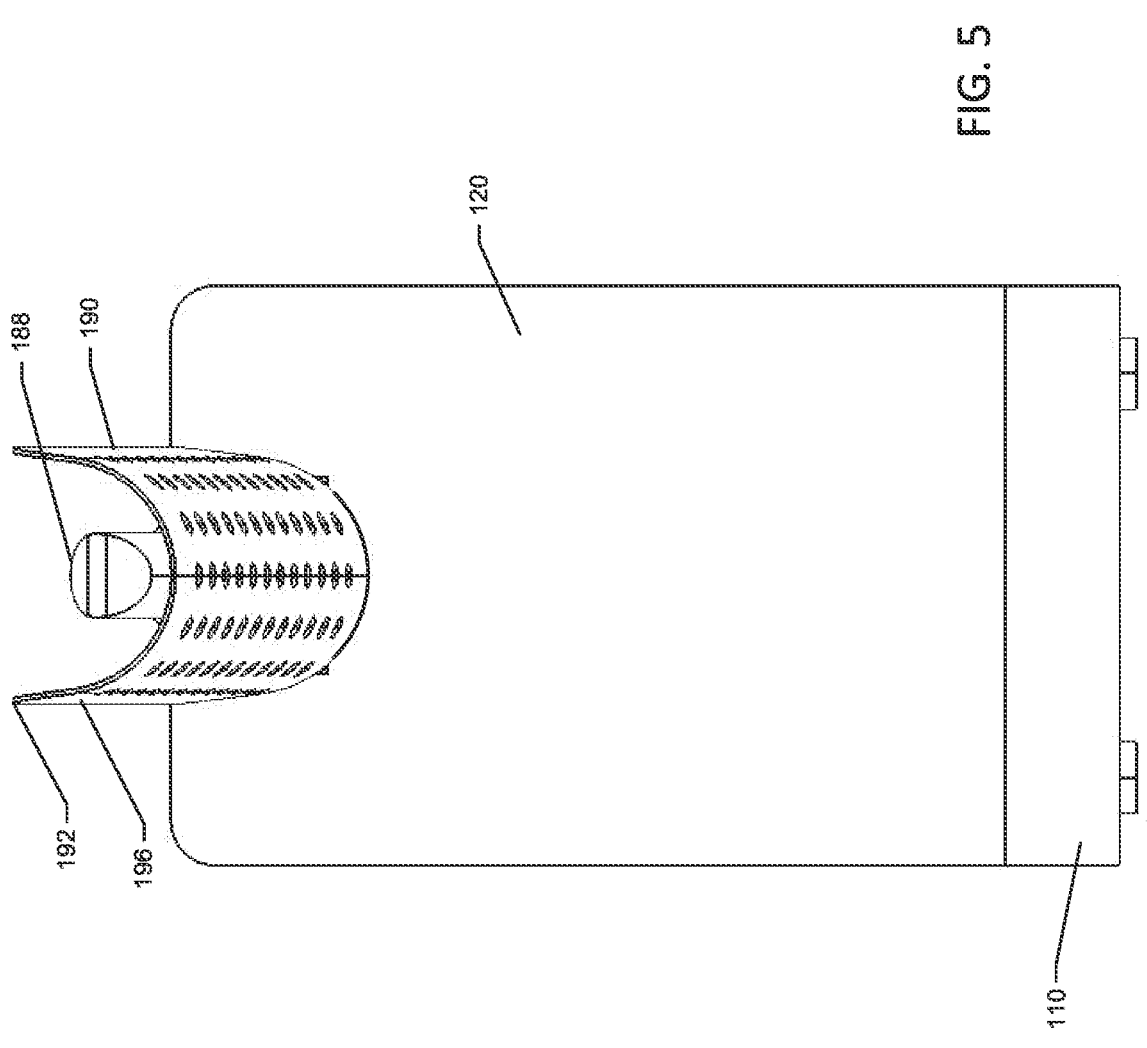
FIG. 5 illustrates a front view of the iron holder of FIG. 1A holding a soldering iron in accordance with an example embodiment.

FIG. 5 illustrates a front view of the iron holder 100 of FIG. 1A holding a soldering iron 180 in accordance with an example embodiment. In some embodiments, the tip 186 may not be in contact with the heat shield 190 when in the tip-up resting position. The heat shield 190 may be offset from the tip 186, but may also provide a level of protection from the tip 186.

Thus, according to an example embodiment, an iron holder for supporting a soldering iron may be provided. The iron holder may include a stand body having a tip support portion, a base support portion that may be operably coupled to the tip support portion, and a handle support portion that may be operably coupled to the base portion and may support a handle of the soldering iron. The tip support portion and the handle support portion may extend away from the base portion. The tip support portion may extend a greater distance away from the base portion than the handle support portion and may define a tip-up rest position for the soldering iron when the iron is supported in the iron holder.

In some cases, the iron holder described above may be augmented or modified by altering individual features mentioned above or adding optional features. The augmentations or modifications may be performed in any combination and in any order. For example, in some cases, the tip support portion, the base portion and the handle support portion may each be formed from a single and continuous piece of metal. In an example embodiment, the iron holder may further include an intermediate portion and an accessory holding portion. In some cases, the intermediate portion may be operably coupled to the base portion and the accessory holding portion. In an example embodiment, the accessory holding portion may be operably coupled to the handle support portion and the intermediate portion. In some cases, the accessory holding portion may include a cup. In an example embodiment, the tip support portion may be orthogonal to the base portion and the handle support portion may be orthogonal to an axis of the soldering iron when the soldering iron is disposed in the iron holder. In some cases, the tip support portion may be orthogonal to the base portion. In an example embodiment, the handle support portion may not be orthogonal to the base portion. In some cases, the handle support portion may form an angle less than 90 degrees with respect to the base portion. In an example embodiment, the iron holder may further include a heat shield that may be operably coupled to the tip support portion. In some cases, the heat shield may comprise an elevated end and a lower end, the elevated end may be disposed farther away from the handle support portion than the lower end. In an example embodiment, the heat shield may comprise a metal plate formed into a half pipe. In some cases, the metal plate may have lateral sides that may extend beyond an axis of the soldering iron when the soldering iron is disposed in the iron holder. In an example embodiment, the heat shield may be spaced apart from the handle support portion.

According to an example embodiment, a soldering system may be provided. The soldering system may include a soldering iron and an iron holder for supporting the soldering iron. The iron holder may include a stand body. The stand body may further include a tip support portion, a base support portion that may be operably coupled to the tip support portion, and a handle support portion that may be operably coupled to the base portion and may support a handle of the soldering iron. The tip support portion and the handle support portion may extend away from the base portion. The tip support portion may extend a greater distance away from the base portion than the handle support portion and may define a tip-up rest position for the soldering iron when the iron is supported in the iron holder.

In some cases, the soldering system described above may be augmented or modified by altering individual features mentioned above or adding optional features. The augmentations or modifications may be performed in any combination and in any order. For example, in some cases, the tip support portion, the base portion and the handle support portion may each be formed from a single and continuous piece of metal. In an example embodiment, the iron holder may further include an intermediate portion and an accessory holding portion. In some cases, the intermediate portion may be operably coupled to the base portion and the accessory holding portion. In an example embodiment, the accessory holding portion may be operably coupled to the handle support portion and the intermediate portion. In some cases, the accessory holding portion may include a cup. In an example embodiment, the tip support portion may be orthogonal to the base portion and the handle support portion may be orthogonal to an axis of the soldering iron when the soldering iron is disposed in the iron holder. In some cases, the tip support portion may be orthogonal to the base portion. In an example embodiment, the handle support portion may not be orthogonal to the base portion. In some cases, the handle support portion may form an angle less than 90 degrees with respect to the base portion. In an example embodiment, the iron holder may further include a heat shield that may be operably coupled to the tip support portion. In some cases, the heat shield may comprise an elevated end and a lower end, the elevated end may be disposed farther away from the handle support portion than the lower end. In an example embodiment, the heat shield may comprise a metal plate formed into a half pipe. In some cases, the metal plate may have lateral sides that may extend beyond an axis of the soldering iron when the soldering iron is disposed in the iron holder. In an example embodiment, the heat shield may be spaced apart from the handle support portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An iron holder for supporting a soldering iron, the iron holder comprising a unitary stand body comprising a single and continuous piece of metal, the the single and continuous piece of metal including:

a tip support portion at a first end of the single and continuous piece of metal;

a base portion at a middle section of the single and continuous piece of metal, the base portion being operably coupled to the tip support portion;

a handle support portion at a second end of the single and continuous piece of metal, the handle support portion being operably coupled to the base portion to support a handle of the soldering iron;

an accessory holding portion, at a middle section of the single and continuous piece of metal, connected to the handle support portion; and an intermediate portion, at the middle section of the single and continuous piece of metal, connecting the accessory holding portion and the base portion, wherein the tip support portion and the handle support portion extend away from the base portion, and wherein the tip support portion extends a greater distance away from the base portion than the handle support portion to define a tip-up rest position for the soldering iron when supported in the iron holder.

2. The iron holder of claim 1, wherein the accessory holding portion is also connected to the intermediate portion, and wherein the accessory holding portion comprises a cup.

3. The iron holder of claim 1, wherein the tip support portion is orthogonal to the base portion and the handle support portion is orthogonal to an axis of the soldering iron when the soldering iron is disposed in the iron holder.

4. The iron holder of claim 1, wherein the tip support portion is orthogonal to the base portion, and wherein the handle support portion is not orthogonal to the base portion.

5. The iron holder of claim 4, wherein the handle support portion forms an angle less than 90 degrees with respect to the base portion.

6. The iron holder of claim 1, further comprising a heat shield operably coupled to the tip support portion, wherein the heat shield comprises an elevated end and a lower end, the elevated end being disposed farther away from the handle support portion than the lower end.

7. The iron holder of claim 6, wherein the heat shield comprises a metal plate formed into a half pipe.

8. The iron holder of claim 7, wherein the metal plate has lateral sides that extend beyond an axis of the soldering iron when the soldering iron is disposed in the iron holder.

9. The iron holder of claim 6, wherein the heat shield is spaced apart from the handle support portion.

10. A soldering system comprising a soldering iron and an iron holder for supporting the soldering iron, the iron holder comprising a unitary stand body comprising a single and continuous piece of metal, the the single and continuous piece of metal including:

a tip support portion at a first end of the single and continuous piece of metal;

a base portion at a middle section of the single and continuous piece of metal, the base portion being operably coupled to the tip support portion;

a handle support portion at a second end of the single and continuous piece of metal, the handle support portion being operably coupled to the base portion to support a handle of the soldering iron such that a tip of the soldering iron is retained proximate to the tip support portion;

an accessory holding portion, at a middle section of the single and continuous piece of metal, connected to the handle support portion; and an intermediate portion, at the middle section of the single and continuous piece of metal, connecting the accessory support portion and the handle support portion, wherein the tip support portion and the handle support portion extend away from the base portion, and wherein the tip support portion extends a greater distance away from the base portion than the handle support portion to define a tip-up rest position for the soldering iron when supported in the iron holder.

11. The soldering system of claim 10, wherein the accessory holding portion is also operably coupled to the intermediate portion, and wherein the accessory holding portion comprises a cup.

12. The soldering system of claim 10, wherein the tip support portion is orthogonal to the base portion and the handle support portion is orthogonal to an axis of the soldering iron when the soldering iron is disposed in the iron holder.

13. The soldering system of claim 10, wherein the tip support portion is orthogonal to the base portion, and wherein the handle support portion is not orthogonal to the base portion.

14. The soldering system of claim 13, wherein the handle support portion forms an angle less than 90 degrees with respect to the base portion.

15. The soldering system of claim 10, wherein the iron holder further comprises a heat shield operably coupled to the tip support portion, wherein the heat shield comprises an elevated end and a lower end, the elevated end being disposed farther away from the handle support portion than the lower end.

16. The soldering system of claim 15, wherein the heat shield comprises a metal plate formed into a half pipe.

17. The soldering system of claim 16, wherein the metal plate has lateral sides that extend beyond an axis of the soldering iron when the soldering iron is disposed in the iron holder.

18. The soldering system of claim 15, wherein the heat shield is spaced apart from the handle support portion.

\* \* \* \* \*